Figure 1:
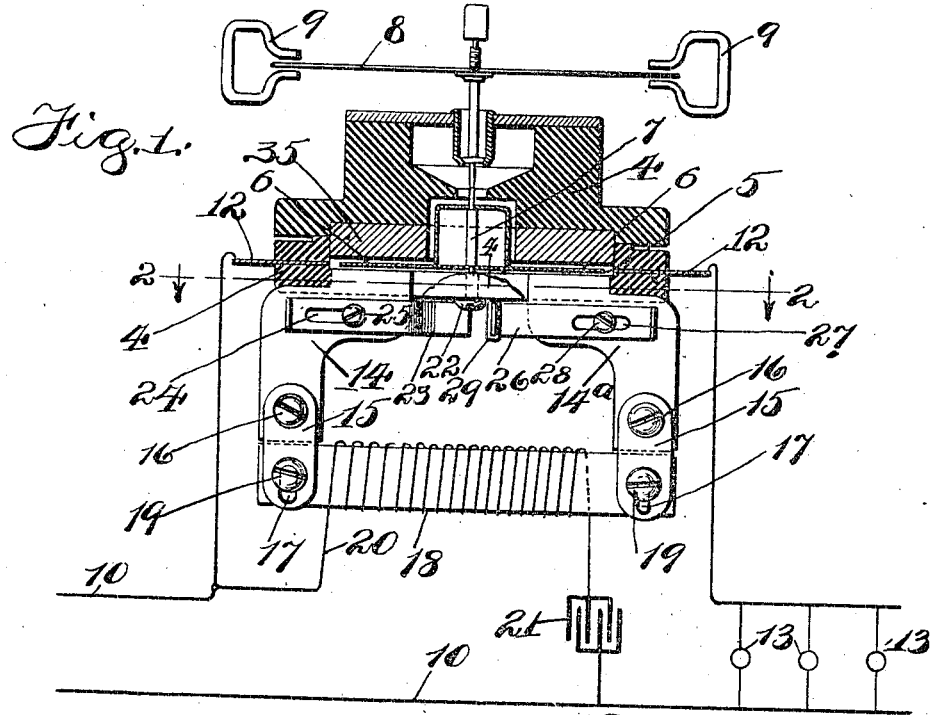

No. 837,411. PATENTED DEC. 4, 1906.
R. C. LANPHIER.
REGULATING DEVICE FOR ELECTRIC METERS.
APPLICATION FILED DEC. 13, 1905.

Witnesses
J. B. Weir
W. H. DeBusk.

Inventor:
Robert C. Lanphier
by Bond, Adams, Pickard & Jackson
Attys

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

REGULATING DEVICE FOR ELECTRIC METERS.

No. 837,411.      Specification of Letters Patent.      Patented Dec. 4, 1906.

Application filed December 13, 1905. Serial No. 291,649.

*To all whom it may concern:*

Be it known that I, ROBERT C. LANPHIER, a citizen of the United States, residing at Springfield, county of Sangamon, State of Illinois, have invented certain new and useful Improvements in Regulating Devices for Electric Meters, of which the following is a full and complete specification, reference being had to the accompanying drawings.

My invention relates to improvements in electrical meters, and particularly to improvements in the electrical meter shown and described by me in my pending application, Serial No. 223,693, filed the 8th day of September, 1904; and its object is to provide a new and improved means for adjusting the inductance of the shunt coil or coils in an alternating-current mercury motor-meter of this type with respect to a condenser interposed in series with said shunt-coil, so as to bring the phase of the shunt-current into zero-phase relation with the impressed electromotive force. In a meter of this type in which a condenser is used in series with the shunt-coil for the purpose of bringing the shunt-current into zero-phase relation with the impressed electromotive force in the manner and for the purpose described in my said application above referred to in the making of the condensers and the winding of the coils it is practically impossible to have their electrical constants exactly the same every time. A coil may be some turns more or less than the normal amount, and the condenser may run a little high or low for capacity. Moreover, the magnetic circuit for the meter itself will not be the same for all meters on account of variaton of quality of iron and differences in air-gaps in the magnetic system. In order to calibrate and adjust the meters quickly and economically, it is necessary, therefore, to have some ready means of adjustment, either in the capacity of the condenser or in the inductance of the shunt-coil. To have means for varying the capacity of the condenser is more expensive and less satisfactory, as it is necessary in such a case to provide the condenser with several taps brought out from it in order to get this variation. This is unsatisfactory and objectionable.

I have therefore devised a new and improved mechanism for varying the inductance of the shunt-coil with respect to the capacity of the condenser, and this is the object of my invention. I attain this object by means of the mechanism illustrated in the drawings and hereinafter described.

That which I believe to be new will be pointed out in the claims.

Figure 2:
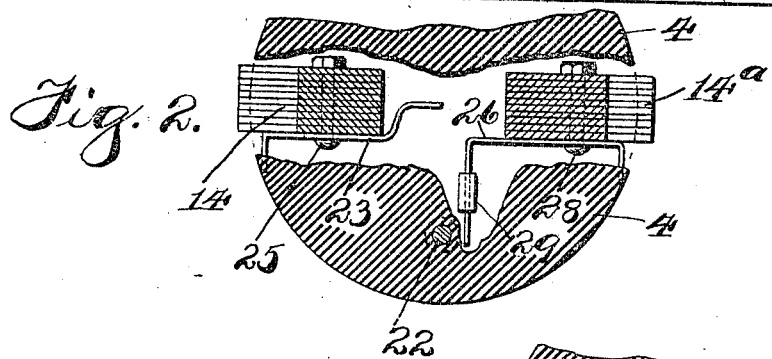
Figure 3:
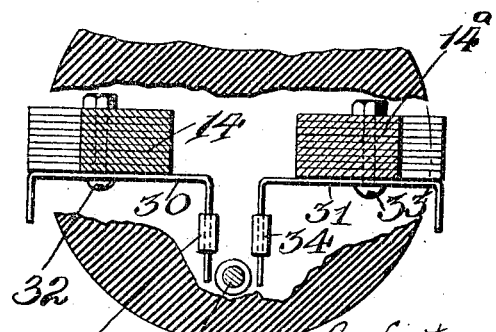

In the drawings, Figure 1 is a side elevation of the working parts of my meter, partially in vertical section. Fig. 2 is a section on line 2 2 of Fig. 1, partly broken away to expose the pole-pieces and the magnetic shunt-pieces. Fig. 3 is a similar view to Fig. 2, showing a modification of the magnetic shunting-pieces.

Referring to the drawings, 4 indicates the casing of the mercury-chamber formed of non-magnetic insulating material and inclosing a circular mercury-chamber 5, in which rotates the disk-armature 6, carried upon a spindle 7.

8 indicates a brake-disk operated upon by permanent magnets 9.

10 indicates the electrical circuit, which is connected with contacts 12, inserted into the wall of the casing 4 and entering the mercury-chamber 5 along the median line of the disk-armature 6, which is in series with the translating devices 13.

14 14ª indicate laminated pole-pieces which extend through the bottom of the casing 4 into the mercury-chamber 5.

15 indicates straps which are secured upon each side of the pole-pieces 14 14ª, as by screws 16. These straps are formed of non-magnetic material and are provided near their lower ends with slots or enlarged openings 17.

18 indicates a yoke or core which is secured between the lower ends of the straps 15 by means of screws 19, which pass through the slots 17, by means of which the yoke or core may be adjusted close against or at varying distances away from the lower ends of the pole-pieces 14 14ª and secured in the desired position.

20 indicates the shunt energizing-winding wound around the core 18.

21 indicates a condenser in series with the shunt-winding 20 and operating to bring the phase of the shunt-current into zero-phase relation with the main current passing through the disk to the translating devices in the manner described and set forth by me in my said application for Letters Patent.

35 indicates a steel plate set in the casing 4 above the disk-armature 6 and acting as the return-path for the magnetic lines of force between the poles 14 14ª. 22 indicates a plug of iron or steel, which is screwed into the bottom of the casing 4 and opens into the mercury-chamber 5 to one side of the path of the main current, passing through the disk-armature. 23 indicates a magnetic shunting-piece formed of iron or steel and provided with a slot 24, by means of which it is adjustably mounted upon the pole-piece 14 by means of a bolt 25. As is best shown in Fig. 2, the inner end of this magnetic shunting-piece is bent inward to nearly the central line between said pole-pieces 14 and 14ª and then projects inward along said central line toward the other pole-piece. This is preferably of such length that when the magnetic shunting-piece 23 is pushed back into the position shown in Fig. 2 it will extend approximately to the center of the distance between the pole-pieces. 26 indicates a shunt-piece of iron or steel, which, by means of a slot 27 and bolt 28, is secured to the other pole-piece 14ª. Its inner end is bent at substantially right angles and outward until it comes in line with the screw-plug 22 and preferably is provided with a band of copper 29, adjustably mounted upon its projecting end, so as to be brought closer to or farther away from the plug 22.

Referring to Fig. 3, 30 31 are magnetic shunting-pieces of iron or steel, which are adjustably mounted, respectively, upon the pole-pieces 14 and 14ª, by means of bolts 32 and 33, passing through suitable slots. The inner ends of each of these magnetic shunting-pieces are bent outward substantially at right angles to face each other and to lie upon each side of the screw-plug 22 and preferably are provided with copper bands 34, adjustable upon the outwardly-extending ends of said shunting-pieces toward and away from the plug 22. It will be readily seen that the magnetic shunting-piece 23 may be adjusted with reference to the opposite pole-piece by means of the bolt 25 and slot 24, for the purposes hereinafter described, and that the two pieces 30 31 may be adjusted so as to be nearer to or farther away from each other for the purposes hereinafter described.

The first adjustment of the inductance of the shunt-coil is made by means of the adjustable yoke or core 18, which, as has been said above, may be adjusted with reference to the pole-pieces 14 and 14ª so as to make the air-gaps between the ends of the pole-pieces and the adjacent surface of the core or yoke 18 anything from zero to their maximum and that the core can be fixed in any position by the tightening of the screws 19. Inasmuch as the gaps in the disk-chamber between the pole-pieces and the return-plate are fixed, it is evident that with a given number of turns in the coil a variation in the air-gaps between the yoke 18 and the lower ends of the pole-pieces 14 and 14ª will make a great difference in the inductance of the shunt-coil. The preliminary or rough adjustment of the inductance of the shunt-coil with reference to the capacity of the condenser is made by varying the amount of its air-gaps by adjusting the position of the yoke 18 with reference to the pole-pieces 14 and 14ª. It will of course be obvious that the increasing of this air-gap decreases the torque of the armature on account of the weakening effect on the shunt-field; but I have found in practice that with my second fine and final adjustment, hereinafter described, I have seldom found it necessary to throw more than a very small amount of air-gap between the pole-pieces and the connecting-yoke. This rough adjustment having been made, a final adjustment is made by the movement of the magnetic shunting-piece 23, mounted on the pole-piece 14, toward or away from the opposite pole-piece 14ª. This piece, as has been stated, is slotted so as to allow for considerable range of motion. By moving this shunting-piece toward or away from the opposite pole-piece a return-path for the magnetic lines of force auxiliary to the path through the return-plate 35 will be formed, which will operate to shunt more or less of the magnetic lines of force as the shunting-piece is moved toward or away from the opposite pole-piece 14ª. The reluctance of the magnetic circuit of the shunt-coil is decreased when this shunting-piece is moved nearer the opposite pole and the inductance of the coil thereby somewhat increased. If the shunting-piece is moved farther away from the opposite pole, the reluctance of the magnetic circuit in the shunt-coil is thereby increased and the inductance in the coil decreased. This shunting-piece is so arranged and of such length that when moved back to its farthest position away from the opposite pole-piece scarcely any magnetic lines of force will pass between its end and the opposite pole-piece and the inductance of the shunt-coil is affected scarcely at all. As this shunting-piece is moved in, as has been explained above, the inductance of the shunt-coil will be gradually increased. When this is so adjusted as to make the inductance of the coil so related to the condenser as to bring the phase of the shunt-coil into zero relation with the impressed electromotive force, the shunting-piece is secured in its position by means of the adjusting-screw. It will be thus seen that the fine and final adjustment of the inductance with relation to the capacity of the condenser to bring the phase of the shunt-coil into zero relation with the impressed electromotive force after the rough adjustment by means of the adjustment of the air-gap above described can be obtained. I have found by experience that it is frequently unnecessary to open the air-gap at all, a sufficient adjustment being obtained by the movement of the magnetic shunting-piece above described. In the modified form of my device (shown in Fig. 3) the same result is obtained by moving the two magnetic shunting-pieces 30 and 31 toward or away from each other, as the case may be, moving them toward each other having the same effect as the moving of the single shunting-piece toward the opposite pole above described and moving them away from each other having the same effect as moving the single shunting-piece away from the opposite pole, as above described. It is believed that this will be readily understood without further description.

It may be added that by means of the two magnetic shunting-pieces 30 and 31 in Fig. 3 or by means of the single shunting-piece 26 in Fig. 2, preferably provided with copper bands, as shown, the additional function may be obtained of compensating on a light load by adjustment of the single shunting-piece 26 or the shunting-pieces 30 and 31 toward or away from the metal plug 22. This function, however, is in addition to the function already described by me and forms no part of my present invention. It is believed, therefore, that it is unnecessary to fully describe it here. It is enough to say that when the tip of either of the two shunting-pieces shown in Fig. 3 or of the single shunting-piece shown in Fig. 2 stands near to the iron or steel plug 22 it will cause a certain amount of leakage magnetism to pass between the pole on which the shunting-piece is attached and the iron plug 22. As these shunting-pieces are long and thin, the magnetic force passing through them and into the screw will lag somewhat in phase from the main magnetism of the pole-pieces. When, therefore, for the purpose of illustration the piece 26 is moved up close to the screw-plug 22, there will be two fields at an angle with each other and slightly out of phase acting on the armature itself, one being between the upper tip of the screw-plug 22 and the return-plate 35 and the other being between the surface of the pole-pieces and the return-plate 35. This lag in magnetism can be increased by placing the short-circuited copper bands 29 34 around the arms of the shunting-pieces. A compensating torque is thus given, opposing any slight static friction which might exist in the bearings of the meter and which would tend to cause it to run slow on a light load.

What I claim as new, and desire to secure by Letters Patent, is—

1. In an alternating-current mercury-meter, the combination with an armature in series with the translating devices, a field-magnet, a shunt energizing-coil, and a condenser in series with said shunt energizing-coil, of an adjustable air-gap in the main magnetic circuit, substantially as described.

2. In an alternating-current mercury-meter, the combination with an armature in series with the translating devices, pole-pieces, a shunt energizing-coil for energizing the same, and a condenser in series with said energizing-coil, of a connecting-yoke adjustable toward and away from said pole-pieces, substantially as described.

3. In an alternating-current mercury-meter, the combination with the armature in series with the translating devices, a field-magnet, a shunt energizing-coil for the same, and a condenser in series with said shunt energizing-coil, of means for varying the reluctance of the magnetic circuit energized by the shunt-winding, substantially as described.

4. In an alternating-current mercury-meter, the combination with the armature in series with the translating devices, a field-magnet, a shunt energizing-coil for the same, and a condenser in series with said shunt energizing-coil, of means for introducing a variable leakage-path between the poles of said magnet for the lines of magnetic force to vary the reluctance of the magnetic circuit energized by the said shunt energizing-coil, substantially as described.

5. In an alternating-current mercury-meter, the combination with the armature, a field-magnet, a shunt energizing-coil, and a condenser in series with said shunt energizing-coil, of an adjustable shunting-piece mounted on one of the poles of said magnet and adapted to be moved toward or away from the other pole, substantially as described.

6. In an alternating-current mercury-meter, the combination with the armature, a field-magnet, a shunt energizing-coil, and a condenser in series with said shunt energizing-coil, of a pair of shunting-pieces mounted on the pole-pieces of said magnet and adapted to be moved toward or away from one another at their opposing ends, substantially as described.

7. In an alternating-current mercury-meter, the combination with the armature in series with the translating devices, a magnet composed of two pole-pieces and a connecting-yoke adjustable to vary the extent of the air-gap between said yoke and said pole-pieces, and a shunt energizing-coil for said magnet, of means for introducing a variable leakage-path for the magnetic lines of force between the poles of said magnet to vary the reluctance of the magnetic circuit energized by said shunt-coil, substantially as described.

8. In an alternating-current mercury-meter, the combination with the armature in series with the translating devices, a magnet composed of two pole-pieces and a connecting-yoke adjustable to vary the extent of the air-gap between said yoke and said pole-pieces, and a shunt energizing-coil for said magnet, of a magnetic shunting-piece mounted upon one of said pole-pieces of the magnet and adjustable at its free end toward or away from the other pole-piece, substantially as described.

ROBERT C. LANPHIER.

In presence of—
BERNARD G. HAYS,
EDWARD J. PIERCE.